United States Patent
Patel et al.

(10) Patent No.: US 11,356,273 B1
(45) Date of Patent: Jun. 7, 2022

(54) AUTHORIZATION ORCHESTRATION FOR DISTRIBUTED SYSTEMS

(71) Applicant: Amazon Technologies, Inc., Seattle, WA (US)

(72) Inventors: Apurva Patel, Plano, TX (US); Bijendra Singh, Cedar Park, TX (US); Denys Tseng, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 562 days.

(21) Appl. No.: 16/364,079

(22) Filed: Mar. 25, 2019

(51) Int. Cl.
| | |
|---|---|
| G06F 21/00 | (2013.01) |
| H04L 9/32 | (2006.01) |
| G06F 16/93 | (2019.01) |
| G06F 21/60 | (2013.01) |
| G06F 11/34 | (2006.01) |
| G06F 21/44 | (2013.01) |

(52) U.S. Cl.
CPC ........ *H04L 9/3247* (2013.01); *G06F 11/3495* (2013.01); *G06F 16/93* (2019.01); *G06F 21/44* (2013.01); *G06F 21/606* (2013.01)

(58) Field of Classification Search
CPC .... H04L 9/3247; G06F 16/93; G06F 11/3495; G06F 21/44; G06F 21/606
USPC ....................................................... 713/176
See application file for complete search history.

(56) References Cited

U.S. PATENT DOCUMENTS

| | | | |
|---|---|---|---|
| 7,739,325 B1 * | 6/2010 | Okita | H04M 3/51 |
| | | | 709/200 |
| 9,361,467 B2 * | 6/2016 | Bracher | G06F 21/6218 |
| 10,554,817 B1 * | 2/2020 | Sullivan | G06N 5/02 |
| 10,673,712 B1 * | 6/2020 | Gosar | G06F 9/4881 |
| 2005/0257045 A1 * | 11/2005 | Bushman | H04L 9/321 |
| | | | 713/156 |
| 2008/0065438 A1 * | 3/2008 | Lee | G06Q 10/063 |
| | | | 705/7.11 |
| 2011/0161284 A1 * | 6/2011 | Tewari | G06F 16/254 |
| | | | 707/609 |
| 2012/0137309 A1 * | 5/2012 | Makam | G06Q 10/10 |
| | | | 719/320 |
| 2014/0156337 A1 * | 6/2014 | Pechanec | G06Q 10/0633 |
| | | | 705/7.27 |
| 2018/0107525 A1 * | 4/2018 | Govindaraju | G06F 8/71 |
| 2019/0122192 A1 * | 4/2019 | Eriksson | G06Q 20/102 |

* cited by examiner

*Primary Examiner* — Josnel Jeudy
(74) *Attorney, Agent, or Firm* — Davis Wright Tremaine LLP

(57) ABSTRACT

A workflow orchestration system obtains a plurality of documents for execution of a workflow on a plurality of different sub-systems. A document from the plurality of documents indicates an action to be executed by a corresponding sub-system and comprises an authorization for execution of the action by the corresponding sub-system. The authorization specified in the document can be verified by the corresponding sub-system. Based on the obtained plurality of documents, the workflow orchestration system determines whether these documents provide sufficient authorizations for execution of the workflow. If so, the workflow orchestration system executes the workflow by transmitting the documents to the corresponding sub-systems for execution of the actions specified therein.

20 Claims, 8 Drawing Sheets

```
{
  { // sub system 1 - action 1
    workOrderId: "work-order-id-1",
    actionId: "action-id-1",
    parameters: {
      ... // details describing the action(s)
    },
    expiration: 0, // optional expiration
    authorization: null
  },
  ...,
  { // sub system m - action n
    workOrderId: "work-order-id-1",
    actionId: "action-id-n",
    parameters: {
      ... // details describing the action(s)
    },
    expiration: 0, // optional expiration
    authorization: null
  }
}
```

Work Order 304

Workflow Orchestration System 302

Sub-System(s) 306

AUTHORIZATION ORCHESTRATION FOR DISTRIBUTED SYSTEMS

BACKGROUND

Organizations often rely on multiple sub-systems to prevent actions on a single sub-system from impacting the performance or availability of other sub-systems maintained by these organizations. Each of these sub-systems may offer specific features that are managed through use of different authorization mechanisms in order to ensure that entities attempting to make use of these specified features are authorized to do so. However, coordination of use of these authorization mechanisms within an organization without exposing these authorization mechanisms at a central location is complex and utilizes a lot of resources.

BRIEF DESCRIPTION OF THE DRAWINGS

Various techniques will be described with reference to the drawings, in which:

FIG. 3 shows an illustrative example of a system in which a workflow orchestration system transmits work order objects from a work order to plurality of sub-systems to obtain authorization for performance of a set of operations specified in the work order in accordance with at least one embodiment;

DETAILED DESCRIPTION

Figure 1:
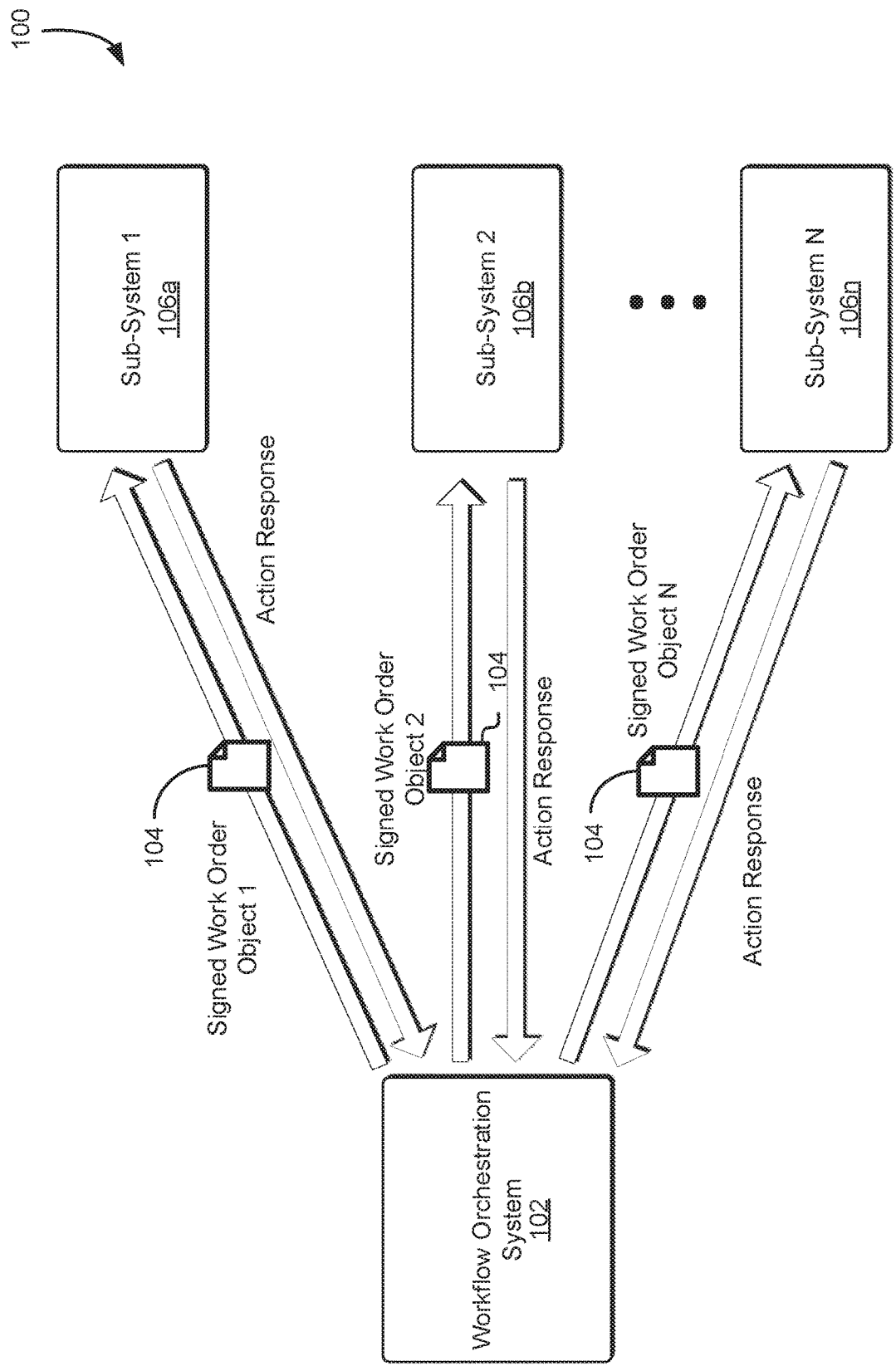
FIG. 1 shows an illustrative example of a system in which various embodiments can be implemented.

Techniques described and suggested herein relate to the orchestration of a workflow for execution of a set of actions among a variety of different sub-systems using the authorization mechanisms of the different sub-systems. In an example, a workflow orchestration system identifies a set of sub-systems that may collectively perform a set of actions to fulfill work orders submitted by the workflow orchestration system. For instance, each sub-system may provide particular functionality that may be used to execute a set of actions. Through identification of the functionality of each of the different sub-systems, the workflow orchestration system may determine which sub-systems are needed in order to achieve the overall operational objectives of the workflow orchestration system.

In one example, the workflow orchestration system establishes a long-term trust relationship with each of the identified sub-systems. For instance, the workflow orchestration system may utilize asymmetric key cryptography between itself and a particular sub-system based on the security requirements of the particular sub-system. Another sub-system may require use of a certificate authority to verify the authenticity of work orders to and from the sub-system. This may cause the workflow orchestration system to establish a trust relationship with not only the sub-system but also the identified certificate authority. Thus, the workflow orchestration system and the various sub-systems may establish the long-term trust relationships in accordance with the prescribed security mechanisms defined by the individual sub-systems.

In one example, the workflow orchestration system generates a work order defining the actions to be performed by the different sub-systems to achieve a particular operational objective. The workflow orchestration system may transmit a work order object to a sub-system that defines the specific actions to be performed by the sub-system. In response to receiving the work order object from the workflow orchestration system, the sub-system may determine whether it can perform the specified actions in accordance with the requirements of the workflow orchestration system. If the sub-system can perform the specified actions in accordance with the requirements of the workflow orchestration system, the sub-system may cryptographically sign the work order object or otherwise provide an authorization subject to the trust relationship established with the workflow orchestration system. In an example, the sub-system can define a set of conditions for execution of the specified actions. For instance, the sub-system may define an expiration for the authorization such that the actions may only be performed prior to the expiration. The sub-system may transmit the work order object with its authorization to the workflow orchestration system. The sub-system may retain a copy of its authorization within a secure datastore in order to verify the authorization if provided at a later time by the workflow orchestration system.

In one example, the workflow orchestration system collects the various work order objects from the different sub-systems and determines whether sufficient authorizations have been granted for execution of the work order. If sufficient authorizations have been granted, the workflow orchestration system may transmit the work order objects to the different sub-systems for execution of the set of actions in the work order. In an example, if the work order objects obtained from the different sub-systems define a set of conditions for execution of actions specified in the work order, the workflow orchestration system may create an ordering of the work order objects to ensure that the actions are performed by the different sub-systems subject to the set of conditions. For instance, if a work order object defines an expiration for an authorization to perform a set of actions, the workflow orchestration system may transmit the work order object to the corresponding sub-system prior to the expiration and with sufficient time to enable execution of the actions prior to the expiration.

In one example, if the workflow orchestration system detects an issue during the execution of the work order, the workflow orchestration system may suspend the work order and notify the affected sub-systems or other entities impacted by suspension of the work order. The workflow orchestration system may determine which sub-system is the cause of the issue and transmit a request to the sub-system to obtain a new authorization for execution of the actions indicated as being performable by the sub-system. If a new authorization is obtained, the workflow orchestration system may transmit a new work order object that includes this new authorization to the sub-system to resume execution of the work order. However, if this new authorization cannot be obtained or the issue cannot be addressed, the workflow orchestration system may revert the work order and generate a new work order. If no issues are detected, the workflow orchestration system may obtain responses from the different sub-systems that the actions were performed successfully, signaling successful execution of the work order.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For example, because each sub-system maintains its own authorization requirements for performance of a set of actions defined by the workflow orchestration system, permissions are no longer centralized. Thus, in the event that the workflow orchestration system is compromised, the security of each of the different sub-systems is maintained. Additionally, since each authorization granted by a sub-system enables a single use of the authorization for execution of a set of actions, an entity that surreptitiously obtains the authorization after execution of the set of actions will be unable to utilize the authorization for any other purpose.

FIG. 1 shows an illustrative example of a system 100 in which various embodiments can be implemented. In the system 100, a workflow orchestration system 102 identifies a plurality of sub-systems 106a-n for execution of a workflow related to a customer or other business objective that is to be achieved by the workflow orchestration system 102 on behalf of a customer or other organization. Each sub-system 106a-n may provide a particular functionality that may be leveraged by the workflow orchestration system 102 for achieving its objective. For example, a first sub-system 106a may provide inventory management interfaces that may be utilized by the workflow orchestration system 102 to track its inventory within a particular geographic region, distribution center, and the like. A second sub-system 106b may provide different functionality, such as regulatory compliance management for delivery of shipments within a particular geographic region or outside of the particular geographic region while a third sub-system 106n may provide different functionality from that of the first sub-system 106a and the second sub-system 106b. The functionality of each of the sub-systems 106a-n may thus be combined to create a system which may be utilized to achieve the objective defined through the workflow orchestration system 102, such as development of a new online marketplace within a particular geographic region that is subject to specific regulations and requirements.

The workflow orchestration system 102, in an embodiment, comprises a collection of computing resources that collectively operate to identify, based on a particular objective, a set of sub-systems 106a-n usable to achieve the particular objective. Further, the workflow orchestration system 102 may establish, with each identified sub-system 106a-n, a communications channel that may be used to ensure secure communication between the workflow orchestration system 102 and the corresponding sub-system 106a-n. For example, the workflow orchestration system 102 may establish a communications channel with a sub-system 106a-n using a Secure Sockets Layer (SSL) cryptographic protocol, a Transport Layer Security (TLS) cryptographic protocol, and the like. Alternatively, the workflow orchestration system 102 may utilize other cryptographic methods, such as a Rivest-Shamir-Adleman (RSA) cryptosystem, a Diffie-Hellman cryptographic key exchange, asymmetric cryptographic key algorithms, symmetric cryptographic key algorithms, and the like, to ensure secure communication over the established communication channel. The particular method utilized for establishing a trust relationship between the workflow orchestration system 102 and a sub-system 106a-n may be negotiated between the workflow orchestration system 102 and the sub-system 106a-n. For example, administrators of the workflow orchestration system 102 and of the particular sub-system 106a-n may select a particular cryptographic protocol or method for transmitting information over a communications channel and for authentication of the entities utilizing the communications channel.

The trust relationship established between the workflow orchestration system 102 and a sub-system 106a-n may be unique. For instance, the workflow orchestration system 102 and a first sub-system 106a-n may establish a communications channel using SSL or TLS. Meanwhile, the workflow orchestration system 102 and a second sub-system 106a-n may establish a different communication channel that relies on a Diffie-Hellman cryptographic key exchange for exchanging information and authentication. The workflow orchestration system 102 may maintain, within an authorization database, information for each communication channel established between the workflow orchestration system 102 and the sub-systems 106a-n to ensure that authentication data, along with other data as described below, is provided in a manner that enables the corresponding sub-system 106a-n to authenticate the workflow orchestration system 102 and to process the other data. Further, through the authorization database, the workflow orchestration system may maintain any required cryptographic keys usable for authentication of sub-systems 106a-n of the plurality of sub-systems. Corresponding sub-systems 106a-n may also maintain an authorization database through which a sub-system 106a-n may store information usable to authenticate communications from the workflow orchestration system 102.

A sub-system 106a-n may comprise a collection of computing resources that collectively operate to provide a specific set of features and interfaces managed by its own set of administrators and subject to its own set of rules and regulations. For instance, a sub-system 106a-n may provide tools for generating a graphical user interface (GUI) that may be used by a workflow orchestration system 102 to establish a new marketplace within a new geographic region. Another sub-system 106a-n may provide programmatic modules for applying regulatory constraints on transactions within different geographic regions, which may be of value to an organization attempting to establish the new marketplace. Thus, the identified set of sub-systems 106a-n may be selected to support the objective provided to the workflow orchestration system 102.

In an embodiment, based on the objective defined by a customer or other entity that is to be achieved using the plurality of sub-systems, the workflow orchestration system 102 generates a work order that specifies the actions to be performed by the sub-systems 106a-n to achieve the objective. Each action defined within the work order may be associated with a particular sub-system 106a-n of the plurality of sub-systems 106a-n. An action specified in the work order may correspond to a desired state change within the sub-system 106a-n that may be used to achieve the objective defined through the workflow orchestration system 102. For example, the workflow orchestration system 106a-n may define an action whereby a sub-system 106a-n is to apply a set of rules for determining whether to allow transport of a particular set of products or other items within a particular geographic region. As another example, the workflow orchestration system 106a-n may define an action whereby another sub-system 106a-n is to apply a particular tax formula for the calculation of taxes related to the purchase of certain goods through an online marketplace established by the customer, administrator, or other entity that defined the objective to be achieved through the workflow orchestration system 102.

In an embodiment, the workflow orchestration system 102 generates, for each individual sub-system 106a-n of the plurality of sub-systems, a work order object that defines the proposed actions to be performed by the corresponding sub-system 106a-n. The workflow orchestration system 102 may transmit a work order object and authentication information to a corresponding sub-system 106a-n using the communications channel established between the workflow orchestration system 102 and the sub-system 106a-n. In response to receiving the work order object and authentication information from the workflow orchestration system 102, the sub-system 106a-n may authenticate the workflow orchestration system 102 using the provided authentication information. If the workflow orchestration system 102 is successfully authenticated, the sub-system 106a-n may evaluate the work order object to determine whether it is able to perform the requested actions within any constraints (e.g., time constraints, regulatory constraints, etc.) defined by the workflow orchestration system 102 in the work order object.

If the sub-system 106a-n determines that the actions specified in the work order object may be performed, the sub-system 106a-n may issue an authorization for execution of the actions specified in the work order. For instance, in an embodiment, the sub-system 106a-n can cryptographically sign the work order object using a public cryptographic key of a cryptographic key pair maintained by the sub-system 106a-n. This cryptographic key pair may be distinct from any other cryptographic protocol or method utilized between the workflow orchestration system 102 and the sub-system 106a-n for secure communications over the communications channel established between the workflow orchestration system 102 and the sub-system 106a-n. Using this public cryptographic key, the sub-system 106a-n may generate a digital signature that can be attached to an authorization field of the work order object. In an embodiment, the sub-system 106a-n stores a copy of the work order object and the digital signature generated by the sub-system 106a-n to provide authorization for performance of the actions specified in the work order object in its authorization database. This may allow the sub-system 106a-n to authenticate a digitally signed work order object 104 provided at a later time for execution of the set of actions specified therein.

In an embodiment, the authorization granted by a sub-system 106a-n for execution of the actions specified in a digitally signed work order object 104 is revoked once the actions have been performed. For example, in response to receiving a digitally signed work order object 104 from the workflow orchestration system 102, the sub-system 106a-n may evaluate the digitally signed work order object 104 to ensure its authenticity. The sub-system 106a-n may utilize its private cryptographic key to authenticate the digital signature and to ensure that the digital signature corresponds to the digital signature attached to the work order object provided to the workflow orchestration system 102. If the digital signature is valid, the sub-system 106a-n may remove the digital signature from its authorization database. Thus, if a second digitally signed work order object 104 having the same digital signature is provided to the sub-system 106a-n, the sub-system 106a-n may reject the digitally signed work order object 104 since the digital signature would no longer be available in the authorization database and, as a result, cannot be validated. It should be noted that individual sub-systems 106a-n of the plurality of sub-systems may utilize any secure authentication protocol for generating a digital signature that may be attached to a work order object. For instance, while an asymmetric cryptographic key protocol may be utilized by a first sub-system, a second sub-system may utilize a unique hashing algorithm to generate a hash of a work order object that can be attached to the work order object as a digital signature.

In an embodiment, based on the actions specified in a work order object, a sub-system 106a-n can define a set of conditions for performance of the actions. For example, a sub-system 106a-n may define an expiration time for the authorization granted to the workflow orchestration system 102 for execution of the set of actions defined in the work order object. Additionally, or alternatively, a sub-system 106a-n can impose a condition whereby authorization by a third-party is required for execution of the set of actions. As yet another example, a sub-system 106a-n may impose, as a condition, limitations on the possible state changes that may be achieved through execution of the actions. These conditions may be defined, by a sub-system 106a-n, in the digitally signed work order object 104 provided to the workflow orchestration system 102. This may allow the workflow orchestration system 102 to determine, based on the conditions, whether the objective can be achieved using this particular sub-system 106a-n.

The workflow orchestration system 102 may obtain, from the plurality of different sub-systems 106a-n, the digitally signed work order objects 104 specifying the various authorizations and conditions for execution of the set of actions from the work order. In an embodiment, the workflow orchestration system 102 evaluates the obtained digitally signed work order objects 104 to determine whether the objective can be achieved. For instance, if the workflow orchestration system 102 determines that a condition imposed by a sub-system 106a-n for execution of a particular set of actions would result in the objective being unreachable, the workflow orchestration system 102 may seek an alternative sub-system to perform the set of actions, revise the work order to address the impact of this condition, terminate the work order, or any other action commensurate with the identification of this issue.

In an embodiment, based on the conditions imposed by one or more of the sub-systems 106a-n of the plurality of sub-systems, the workflow orchestration system 102 may generate an ordering of the digitally signed work order objects 104 for execution of the set of actions in the work order. For instance, if a sub-system 106a-n has defined an expiration time for its authorization to execute the set of actions, the workflow orchestration system 102 may generate an ordering that prioritizes execution of this set of actions. This may cause the workflow orchestration system 102 to transmit the digitally signed work order object 104 associated with this sub-system 106a-n to the sub-system 106a-n earlier than other digitally signed work order objects to avoid expiration of the authorization granted by the sub-system 106a-n.

It should be noted that while conditions are described, throughout the present disclosure, as being defined by the sub-systems 106a-n as an illustrative example, conditions may be defined by other entities. For example, a customer of the workflow orchestration system 102 may define one or more conditions that may cause the workflow orchestration system 102 to generate an ordering of the actions that are to be executed by the different sub-systems 106a-n. These conditions, defined by the customer of the workflow orchestration system 102, may define a timeline for execution of certain actions for the workflow. Thus, based on this timeline, the workflow orchestration system 102 may generate the ordering of the digitally signed work order objects 104 for execution of these actions in accordance with the timeline provided by the customer.

In response to obtaining the digitally signed work order objects 104 from the individual sub-systems 106a-n of the plurality of sub-systems, the workflow orchestration system 102 may initiate the execution of the work order. The workflow orchestration system 102 may transmit the digitally signed work order objects 104 to the corresponding sub-systems 106a-n of the plurality of sub-systems to cause these corresponding sub-systems 106a-n to execute the set of actions defined therein. The workflow orchestration system 102 may monitor the progress of the individual sub-systems 106a-n to ensure that the set of actions are executed and completed successfully.

In an embodiment, if the workflow orchestration system 102 detects an issue impacting the execution of a set of actions from a particular work order object, the workflow orchestration system 102 suspends execution of the work order and notifies the administrators of the sub-system 106a-n tasked with execution of the set of actions. For instance, the workflow orchestration system 102 may transmit a request to the sub-system 106a-n to request a new authorization for execution of the set of actions. This may cause the sub-system 106a-n to issue a new digital signature or other cryptographically verifiable assertion of an authorization to the workflow orchestration system 102. This new authorization may be attached to a new work order object that is provided to the workflow orchestration system 102. This may cause the workflow orchestration system 102 to transmit this new digitally signed work order object to the sub-system 106a-n to retry execution of the set of actions. In an embodiment, if the workflow orchestration system 102 determines that the work order can no longer be executed successfully as a result of the detected issue, the workflow orchestration system 102 can revert the work order. This may include suspending any pending actions by transmitting a notification to the individual sub-systems 106a-n executing other actions on behalf of the workflow orchestration system 102. Additionally, or alternatively, the workflow orchestration system 102 may evaluate the impact of the issue and define a new work order that compensates for the issue but that may also be used to achieve the specified objective.

Figure 2:
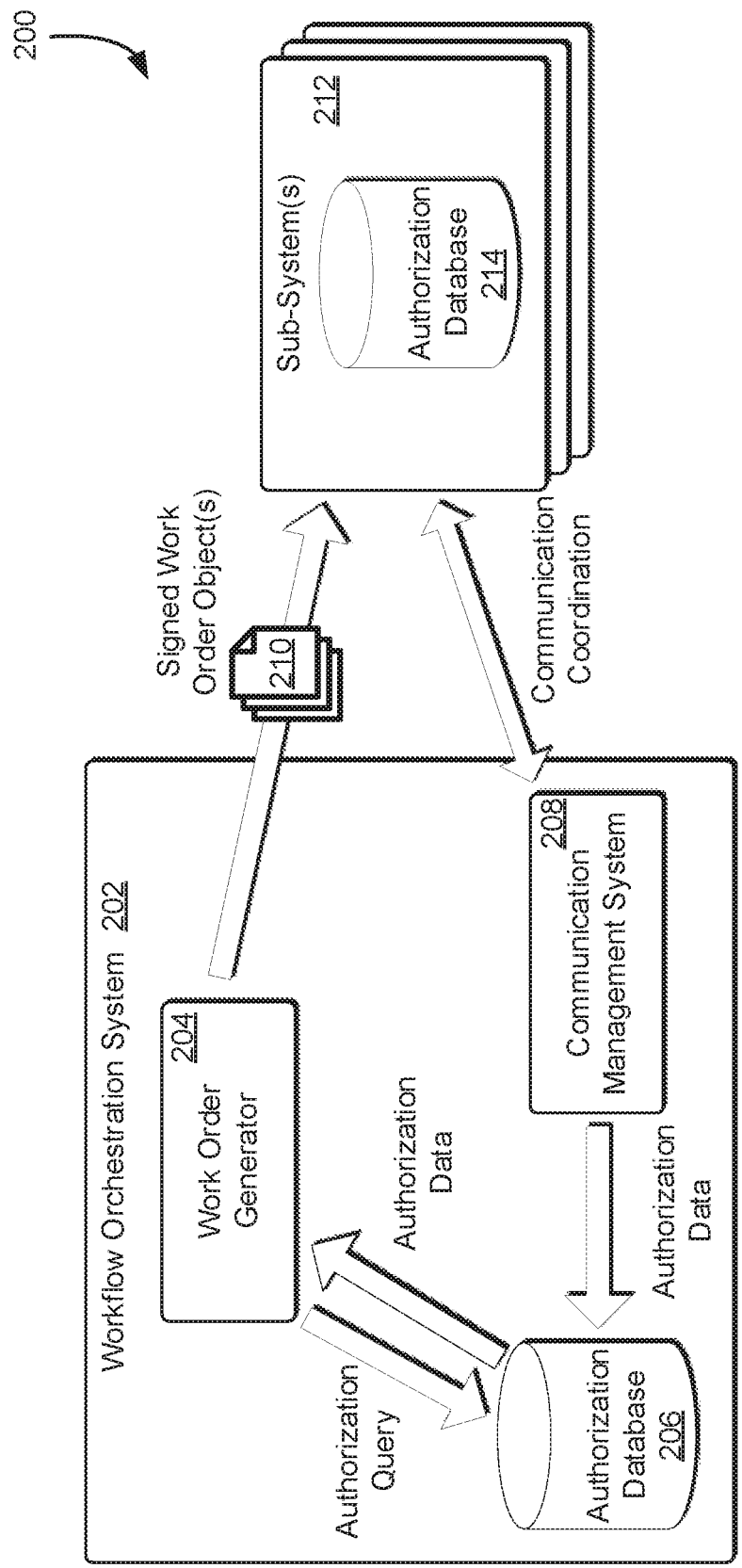
FIG. 2 shows an illustrative example of a system in which a workflow orchestration system obtains digitally signed work order objects indicating authorization to perform a set of operations through a plurality of sub-systems in accordance with at least one embodiment.

FIG. 2 shows an illustrative example of a system 200 in which a workflow orchestration system 202 obtains digitally signed work order objects 210 indicating authorization to perform a set of operations through a plurality of sub-systems 212 in accordance with at least one embodiment. In the system 200, the workflow orchestration system 202, through a communication management system 208, establishes a communication channel with individual sub-systems 212 of the plurality of sub-systems. The communication management system 208 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The communication management system 208 may establish a communications channel with a sub-system 212 using a SSL cryptographic protocol, a TLS cryptographic protocol, and the like. Alternatively, the communication management system 208 may utilize other cryptographic methods, such as a RSA cryptosystem, a Diffie-Hellman cryptographic key exchange, asymmetric cryptographic key algorithms, symmetric cryptographic key algorithms, and the like, to ensure secure communication over the established communication channel. As noted above, the particular method utilized for establishing a trust relationship between the workflow orchestration system 202 and a sub-system 212 may be negotiated between the communication management system 208 and the sub-system 212.

The communication management system 208 may store, within an authorization database 206, information for each communication channel established between the workflow orchestration system 202 and the sub-systems 212 to ensure that authentication data, along with other data as described below, is provided in a manner that enables the corresponding sub-system 212 to authenticate the workflow orchestration system 202 and to process the other data. Further, through the authorization database 206, the communication management system 208 may maintain any required cryptographic keys usable for authentication of sub-systems 212 of the plurality of sub-systems. Corresponding sub-systems 212 may also maintain an authorization database 214 through which a sub-system 212 may store information usable to authenticate communications from the workflow orchestration system 202. The authorization database 206 may comprise a key-value datastore whereby authentication and authorization information may be stored for corresponding workflow orchestration system-sub-system pairings. Each entry in the authorization database 206 corresponding to a pairing may specify the authentication and authorization mechanisms negotiated between the communication management system 208 and the sub-system 212 for establishing the trust relationship between these systems. Further, the entry may specify any cryptographic keys or credentials usable for authentication of the workflow orchestration system 202 by the sub-system 212, as well as information usable to authenticate the sub-system 212.

In an embodiment, the workflow orchestration system 202 includes a work order generator 204, which can generate work orders based on objectives obtained from customers, administrators, or other entities associated with an organization that may leverage the functionality of the various different sub-systems 212 for a particular purpose. The work order generator 204 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein.

The work order generator 204 may generate, based on the objective to be achieved and for each individual sub-system 212 of the plurality of sub-systems, a work order object that defines the proposed actions to be performed by the corresponding sub-system 212. Further, the work order generator 204 may query the authorization database 206 to obtain any authentication and authorization information from the authorization database 206 that is to be included with the work order object to allow the sub-systems 212 to authenticate the work order objects and to determine whether the work order generator 204 is authorized to submit a request for performance of the actions specified in the work order objects.

The work order generator 204 may transmit a work order object and any authorization and authentication information to a corresponding sub-system 212 using the communications channel established by the communication management system 208 with the sub-system 212. In response to receiving the work order object and authorization/authentication information from the work order generator 204, the sub-system 212 may authenticate the workflow orchestration system 202 using the provided authentication information. If the workflow orchestration system 202 is successfully authenticated, the sub-system 212 may evaluate the work order object to determine whether it is able to perform the requested actions within any constraints (e.g., time constraints, regulatory constraints, etc.) defined by the work order generator 204 in the work order object. Further, using the authorization information provided by the work order generator 204, the sub-system 212 may determine whether the workflow orchestration system 202 is authorized to have these actions performed by the sub-system 212 on behalf of the workflow orchestration system 202.

If the sub-system 212 determines that the actions specified in the work order object may be performed, the sub-system 212 may issue an authorization for execution of the actions specified in the work order. As noted above, the sub-system 212 can cryptographically sign the work order object using a public cryptographic key of a cryptographic key pair maintained by the sub-system 212. Using this public cryptographic key, the sub-system 212 may generate a digital signature that can be attached to an authorization field of the work order object. In an embodiment, the sub-system 212 stores a copy of the work order object and the digital signature generated by the sub-system 212 to provide authorization for performance of the actions specified in the work order object in its authorization database 214.

Similar to the authorization database 206 of the workflow orchestration system 202, the authorization database 214 maintained by each individual sub-system 212 may comprise a key-value datastore whereby authorization information may be stored for work order objects obtained from the workflow orchestration system 202. Each entry in the authorization database 206 corresponding to a work order object may specify the authorization mechanisms utilized for generating the digital signature or other cryptographically verifiable assertion of an authorization for execution of the actions specified in the work order object. For instance, an entry may specify the digital signature and the unencrypted work order object for which the digital signature was generated. Further, the entry may specify the cryptographic algorithm or other method utilized to generate the digital signature. This may allow the sub-system 212 to verify the digital signature in the event that the workflow orchestration system 202 transmits a digitally signed work order object 210 specifying a digital signature of the sub-system 212.

As noted above, the sub-system 212 can define a set of conditions for performance of the actions specified in the work order object. These conditions may be defined, by a sub-system 212, in the digitally signed work order object 210 provided to the workflow orchestration system 202. This may allow the work order generator 204 to determine, based on the conditions, whether the objective can be achieved using this particular sub-system 212. The sub-system 212 may specify this set of conditions in an entry within the authorization database 214 corresponding to the work order object and associated authorization. Thus, if the sub-system 212 obtains a digitally signed work order object 210 from the work order generator 204 at a later time, the sub-system 212 may identify any conditions on execution of the actions specified in the work order object to determine whether the actions can be executed.

The work order generator 204 may obtain the various digitally signed work order objects 210 from the plurality of different sub-systems 212. In response, the work order generator 204 may evaluate the digitally signed work order objects 210 to determine whether authorizations have been granted for execution of the actions specified therein. For instance, as described in greater detail below, a work order object may include an authorization field through which a sub-system 212 may insert a digital signature or other cryptographically verifiable assertion of an authorization for execution of the actions specified in the work order object. The work order generator 204 may also evaluate the various digitally signed work order objects 210 to identify any conditions imposed by any of the plurality of different sub-systems 212 to determine whether the conditions can be satisfied for execution of the specified actions. If the work order generator 204 determines that one or more authorizations were not granted and/or that one or more conditions imposed by any of the plurality of different sub-systems 212 cannot be satisfied, the work order generator 204 may determine that execution of the workflow is not possible. This may result in the work order generator 204 modifying the various work order objects to propose actions that are more likely to be authorized by the various sub-systems 212 and/or to satisfy any conditions that may be imposed by any of the various sub-systems 212.

In an embodiment, if any of the plurality of digitally signed work order objects 210 specify one or more conditions imposed by a corresponding sub-system 212 that is to be satisfied in order for execution of the actions specified therein, the work order generator 204 may generate an ordering of the digitally signed work order objects 210 for transmission to the different sub-systems 212. For instance, if a sub-system 212 has defined an expiration time for its authorization to execute the set of actions, the ordering generated by the work order generator 204 may prioritize execution of the set of actions specified in the corresponding digitally signed work order object 210. This may cause the workflow orchestration system 202 to transmit the digitally signed work order object 210 associated with this sub-system 212 to the sub-system 212 prior to other digitally signed work order objects to avoid expiration of the authorization granted by the sub-system 212.

The work order generator 204 may initiate execution of the workflow associated with the objective that is to be reached by transmitting the digitally signed work order objects to the corresponding sub-systems 212. In an embodiment, a sub-system 212 that obtains a digitally signed work order object 210 evaluates the digital signature or other cryptographically verifiable assertion of authorization specified in the digitally signed work order object 210 to determine whether the authorization assertion is valid. For instance, the sub-system 212 may compare the digital signature from the obtained digitally signed work order object 210 to the digital signature specified in the corresponding entry within its authorization database 214. Further, the sub-system 212 may utilize its private cryptographic key or other cryptographic method to determine the validity of the digital signature. Additionally, if the work order object indicates that there are one or more conditions that are to be met in order to allow execution of the actions specified in the work order object, the sub-system 212 may determine whether these conditions have been satisfied. If these conditions have been satisfied and the authorization is valid, the sub-system 212 may execute the set of actions specified in the work order object 210. In an embodiment, the sub-system 212 removes the entry corresponding to the work order object and the corresponding authorization (e.g., digital signature, cryptographically verifiable assertion of authorization, etc.) from the authorization database 214. This ensures that the authorization can only be utilized once before the workflow orchestration system 202 is required to obtain a new authorization for performance of actions specified in the work order object.

As noted above, the workflow orchestration system may generate a work order that specifies the various actions that are to be performed by the plurality of different sub-systems to achieve a particular objective. The work order may be divided into a plurality of work order objects, which may each specify the set of actions to be performed by a particular sub-system. A work order object may be a document that specifies these actions for execution of a workflow to update the particular sub-system to which the work order object is being provided. Accordingly, FIG. 3 shows an illustrative example of a system 300 in which a workflow orchestration system 302 transmits work order objects from a work order 304 to a plurality of sub-systems 306 to obtain authorization for performance of a set of operations specified in the work order in accordance with at least one embodiment.

In the system 300, the workflow orchestration system 302 generates a work order 304 that defines, for each individual sub-system 306 of the plurality of sub-systems, a set of actions to be performed by the sub-system 306. In an embodiment, the work order 304 specifies, for each sub-system 306, the actions that are to be performed by the sub-system 306 for achieving the particular objective identified by the workflow orchestration system 302. For example, the work order 304 may include a set of code snippets usable to define, through a programmatic language or code, the actions to be undertaken by a particular sub-system 306. As illustrated in FIG. 3, each code snippet may comprise an identifier corresponding to the sub-system that is to perform the set of actions specified in the code snippet. Further, for each set of actions to be performed by a sub-system 306, the workflow orchestration system 302 may assign a unique action identifier that may be used by the workflow orchestration system 302 to identify the actions associated with the particular code snippet to be incorporated into a work order object for a particular sub-system 306. For instance, the workflow orchestration system 302 may maintain a database whereby each entry may correspond to a unique action identifier. For each entry, the workflow orchestration system 302 may specify the various actions associated with the unique action identifier.

Through the code snippet, the workflow orchestration system 302 may also provide programmatic instructions that, if executed by the corresponding sub-system 306, would cause the sub-system 306 to perform the actions requested by the workflow orchestration system 302. These programmatic instructions may also include any parameters usable by the corresponding sub-system 306 to execute the actions in accordance with the requirements set forth by the workflow orchestration system 302. It should be noted that the programmatic instructions may be encoded using any programmatic language that may be processed by the different sub-systems 306. For instance, during the establishment of the communication session with a sub-system 306, the workflow orchestration system 302 and the sub-system 306 may select a programmatic language for generating and executing the various actions that are to be assigned to the particular sub-system 306. Thus, the work order 304, in some instances, may encode the various actions for the different sub-systems 306 using different programmatic languages based on the programmatic languages negotiated with these different sub-systems 306.

In an embodiment, the workflow orchestration system 302 divides the work order 304 into a plurality of documents, or work order objects, for execution of a workflow defined through the various actions specified in the plurality of documents. Each document may specify the set of actions to be performed by the destination sub-system and may be encoded using the programmatic language selected during the establishment of the communication channel between the workflow orchestration system 302 and the corresponding sub-system 306. The workflow orchestration system 302 may transmit these work order objects to the corresponding sub-systems 306 to obtain authorizations for execution of the workflow defined through the various actions specified in the work order 304.

In response to receiving a work order object from the workflow orchestration system 302, a sub-system 306 may determine whether to grant an authorization to the workflow orchestration system 302 for execution of the particular actions specified in the work order object. The sub-system 306 may evaluate the work order object to determine whether it is able to perform the requested actions within any constraints (e.g., time constraints, regulatory constraints, etc.) defined by the workflow orchestration system 302 in the work order object. If the sub-system 306 determines that the actions specified in the work order object may be performed, the sub-system 306 may issue an authorization for execution of the actions specified in the work order object. As noted above, the sub-system 306 can cryptographically sign the work order object using a public cryptographic key of a cryptographic key pair maintained by the sub-system 306. For instance, using this public cryptographic key, the sub-system 306 may generate a digital signature that can be attached to an authorization field of the work order object. The sub-system 306 may store a copy of the work order object and the digital signature generated by the sub-system 306 to provide authorization for performance of the actions specified in the work order object in its authorization database. This may allow the sub-system 306 to authenticate a digitally signed work order object provided at a later time for execution of the set of actions specified therein.

In an embodiment, the workflow orchestration system 302 can define, in the work order 304, one or more conditions for execution of the set of actions specified therein. These conditions may be imposed by a customer of the workflow orchestration system 302 or other entity associated with the workflow orchestration system 302 for execution of the set of actions. These conditions may comprise deadlines for execution of certain actions specified in the work order 304.

Additionally, or alternatively, these conditions may comprise an ordering for execution of the set of actions specified in the work order 304. A sub-system 306 receiving a work order object that specifies one or more conditions for execution of the set of actions defined in the work order object may evaluate the one or more conditions to determine whether it is capable of performing these actions and, simultaneously, satisfying these conditions. If the sub-system 306 determines that it can perform these actions subject to the conditions defined in the work order object, the sub-system may provide its authorization for execution of these actions.

Figure 4:
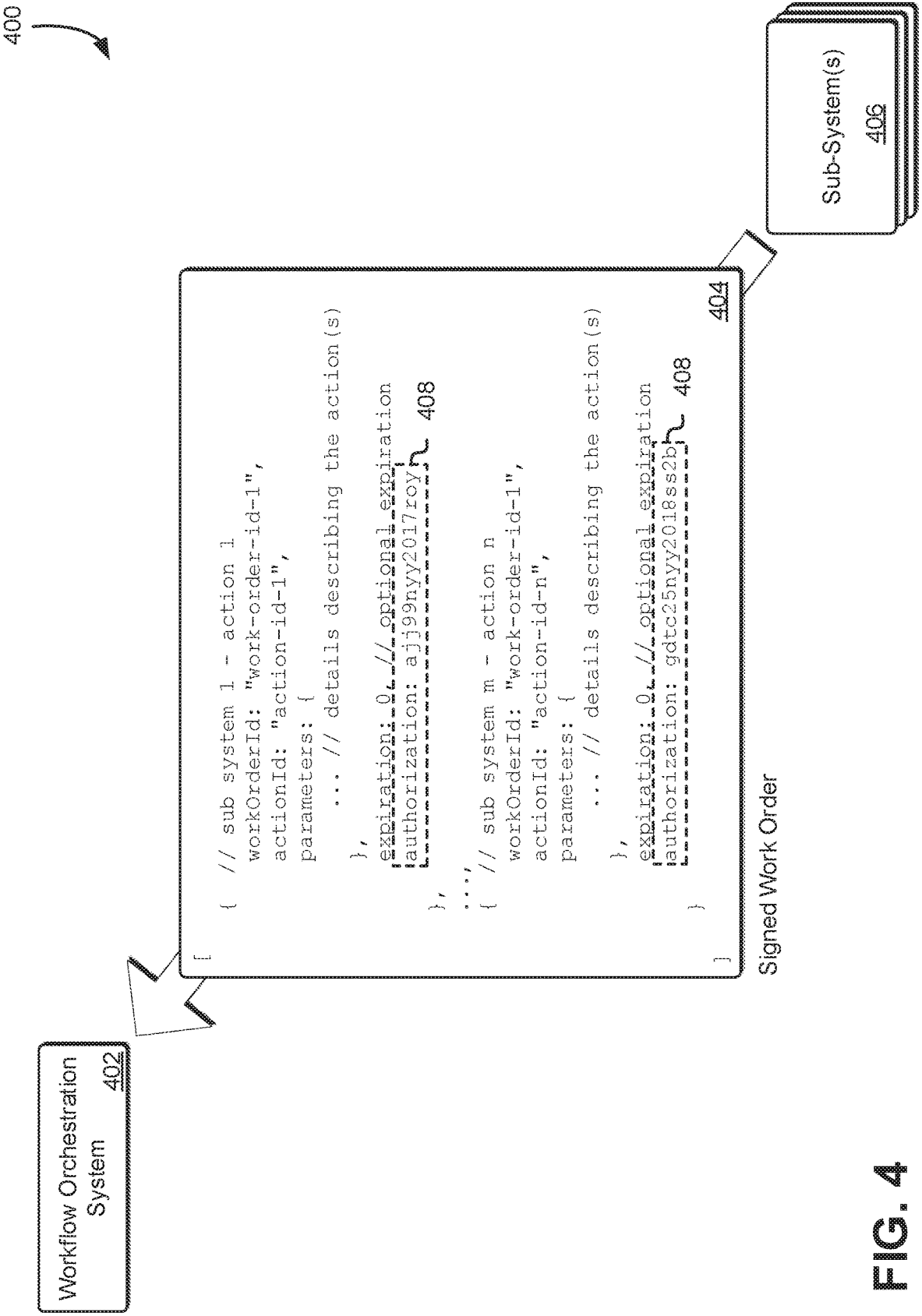
FIG. 4 shows an illustrative example of a system in which a plurality of sub-systems transmit digitally signed work order objects to the workflow orchestration system that provides authorization for performance of a set of operations in accordance with at least one embodiment.

As noted above, the workflow orchestration system may obtain the various authorizations from the plurality of different sub-systems to determine whether the work order can be completed successfully to reach the objective identified by the workflow orchestration system. For instance, the workflow orchestration system may determine whether it has received a digitally signed work order object from each of the plurality of different sub-systems. If the workflow orchestration system has not obtained all digitally signed work order objects from the plurality of different sub-systems, the workflow orchestration system may determine whether to resend work order objects to the sub-systems for which no authorization has been obtained or to revert the work order and restart the process of negotiating with the various sub-systems to determine which actions can be performed by the different sub-systems. Further, the workflow orchestration system may evaluate the digitally signed work order objects to determine whether any of these digitally signed work order objects specify conditions for execution of the actions therein. For instance, if a digitally signed work order specifies a set of conditions for execution of the actions specified therein, the workflow orchestration system may determine whether the conditions can be satisfied for execution of the actions. Based on these conditions, the workflow orchestration system may prioritize certain actions over others or determine whether the work order can be completed successfully. Accordingly, FIG. 4 shows an illustrative example of a system 400 in which a plurality of sub-systems 406 transmit digitally signed work order objects to the workflow orchestration system 402 that provides authorization for performance of a set of operations in accordance with at least one embodiment.

Each digitally signed work order object transmitted by a sub-system 406 may include an authorization field 408, through which the sub-system 406 may attach its digital signature or other cryptographically verifiable assertion of an authorization for performance of the actions specified therein. As noted above, if a sub-system 406 determines that the actions specified in the work order object provided by the workflow orchestration system 402 may be performed, the sub-system 406 may issue an authorization for execution of the actions specified in the work order object. The sub-system 406 can cryptographically sign the work order object using a public cryptographic key of a cryptographic key pair maintained by the sub-system 406. Using this public cryptographic key, the sub-system 406 may generate the digital signature that can be attached to an authorization field of the work order object. In an embodiment, the sub-system 406 stores a copy of the work order object and the digital signature generated by the sub-system 406 to provide authorization for performance of the actions specified in the work order object in its authorization database. This authorization may be revoked by the sub-system 406 when it receives the digitally signed work order object from the workflow orchestration system 402 for execution of the actions specified in the work order object and associated with the workflow.

In an embodiment, a sub-system 406 can make a conditional authorization by defining a set of conditions that are to be satisfied in order for performance of the set of actions specified in the work order object. For instance, a sub-system 406 may define, within the work order object, an expiration time for the authorization granted to the workflow orchestration system 402 for execution of the set of actions defined in the work order object. Additionally, or alternatively, a sub-system 406 can impose a condition whereby authorization by a third-party is required for execution of the set of actions. As yet another example, a sub-system 406 may impose, as a condition, limitations on the possible state changes that may be achieved through execution of the actions. These conditions may be defined, by a sub-system 406, in the digitally signed work order object provided to the workflow orchestration system 402.

Using the digitally signed work order objects from the plurality of different sub-systems 406, the workflow orchestration system 402 may generate the digitally signed work order 404. The workflow orchestration system 402 may evaluate the digitally signed work order 404 to determine whether the workflow may be executed by the plurality of different sub-systems 406 successfully. For instance, the workflow orchestration system 402 may determine whether it is missing any authorizations from any of the sub-systems 406 for performance of a set of actions specified in the work order 404. If so, the workflow orchestration system 402 may determine whether to submit a new authorization request (e.g., work order objects) to the sub-systems that have not provided their authorizations for execution of their assigned actions.

Additionally, the workflow orchestration system 402 may evaluate any conditions imposed by any of the sub-systems 406 to determine whether these conditions may be satisfied for execution of the workflow. For instance, if a sub-system 406 has defined an expiration time for its authorization to execute the set of actions specified in its work order object, the workflow orchestration system 402 may generate an ordering that prioritizes execution of the set of actions specified in the corresponding digitally signed work order object. This may cause the workflow orchestration system 402 to transmit the digitally signed work order object associated with this sub-system 406 to the sub-system 406 prior to other digitally signed work order objects to avoid expiration of the authorization granted by the sub-system 406.

If a determination is made by the workflow orchestration system 402 that all authorizations have been obtained and that conditions specified by the sub-systems 406, if any, can be satisfied, the workflow orchestration system 402 may transmit the digitally signed work order objects from the digitally signed work order 404 to the plurality of different sub-systems 406 for execution of the workflow. The workflow orchestration system may monitor execution of the workflow to ensure that the workflow is completed successfully. If the workflow orchestration system 402 detects any issues associated with execution of the workflow, the workflow orchestration system 402 may determine whether the issue may be addressed through renewal of an authorization for execution of actions impacted as a result of the issue. If not, the workflow orchestration system 402 may revert the work order and develop a new workflow that may be completed in order to achieve the objective set forth.

Figure 5:
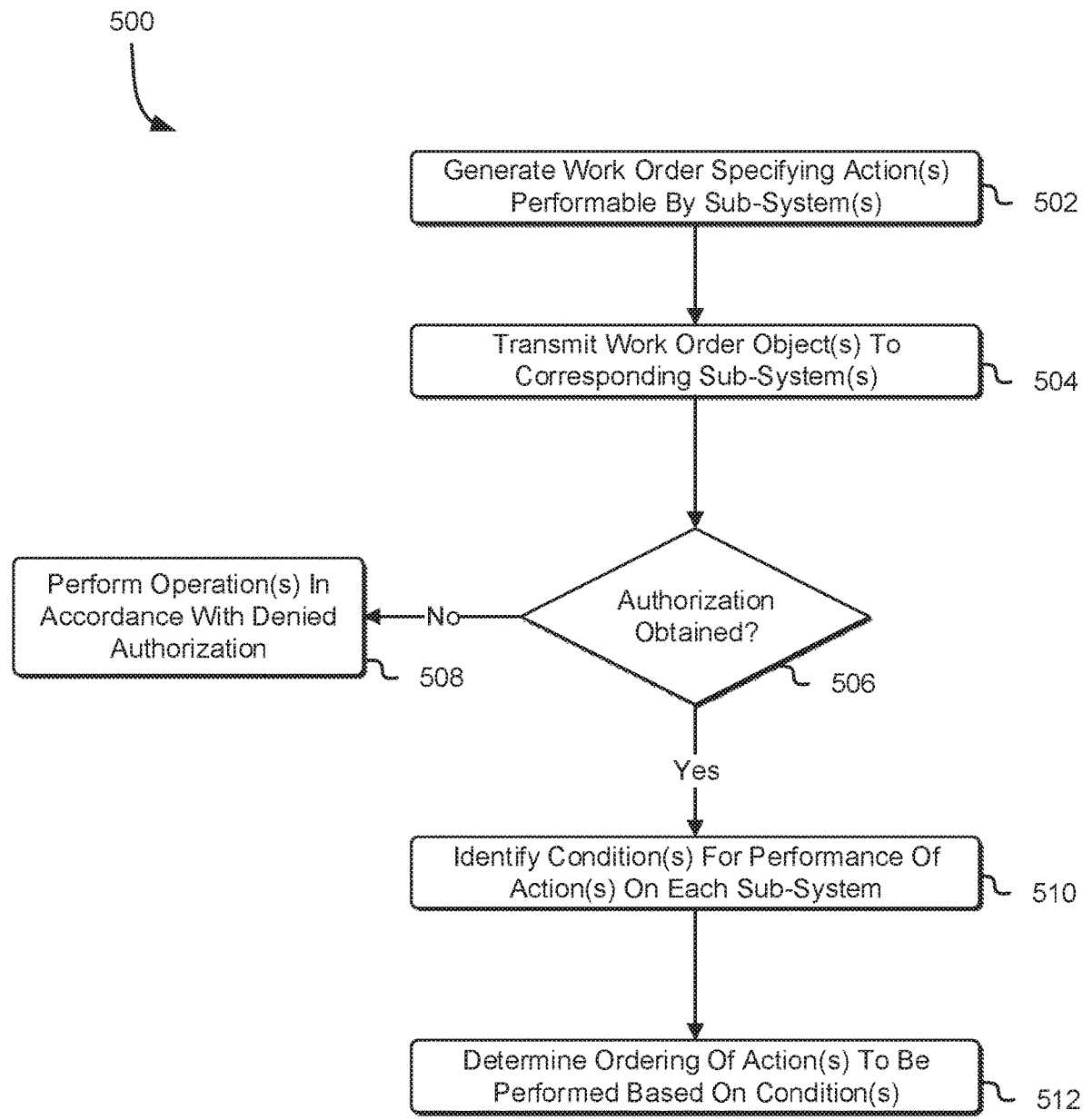
FIG. 5 shows an illustrative example of a process for obtaining authorizations from different sub-systems for execution of a workflow specified in a work order in accordance with at least one embodiment.

FIG. 5 shows an illustrative example of a process 500 for obtaining authorizations from different sub-systems for execution of a workflow specified in a work order in accordance with at least one embodiment. The process 500 may be performed by a workflow orchestration system that may identify a plurality of sub-systems for execution of a workflow associated with an objective defined through the workflow orchestration system. Further, the workflow orchestration system may identify the actions to be performed by each sub-system in order to execute the workflow and reach the objective.

In an embodiment, the workflow orchestration system generates 502 a work order specifying a plurality of actions that may be executed by a plurality of different sub-systems for execution of a workflow associated with a particular objective. For instance, the workflow orchestration generator may generate, based on the objective to be achieved and for each individual sub-system of the plurality of sub-systems, a work order object that defines the proposed actions to be performed by the corresponding sub-system. Each work order object may also include any authentication and authorization information that may be used by a sub-system to authenticate the workflow orchestration system and determine whether the workflow orchestration system is authorized to request performance of the actions specified therein.

The workflow orchestration system may transmit 504 the work order objects created based on the workflow to be executed to corresponding sub-systems of the plurality of sub-systems to obtain authorization for execution of the actions specified in the work order objects. If a sub-system determines that the actions specified in an obtained work order object may be performed, the sub-system may issue an authorization for execution of the actions specified in the work order. For instance, the sub-system may generate a digital signature or cryptographically verifiable assertion of an authorization that can be attached to an authorization field of the work order object.

The workflow orchestration system may obtain digitally signed work order objects from the plurality of different sub-systems. In response to obtaining these digitally signed work order objects, the workflow orchestration system may determine 506 whether authorization has been obtained from the sub-systems of the plurality of sub-systems for execution of the workflow. For instance, if the workflow orchestration system obtains a work order object that is missing a digital signature or other cryptographically verifiable assertion of an authorization, the workflow orchestration system may determine that authorization has not been granted by the particular sub-system. If the workflow orchestration system determines that authorization has not been granted by one or more sub-systems, the workflow orchestration system may perform 508 operations in accordance with a denied authorization. This may include submitting new work order objects to the particular sub-systems that did not provide their authorization, modifying the actions specified in these work order objects to create a new set of actions that may increase the likelihood of obtaining an authorization, and the like. Alternatively, the workflow orchestration system may revert the work order and re-evaluate the objective to determine whether alternative actions may be performed to achieve the objective. This may result in the generation of a new work order and/or the establishment of a new relationship with other sub-systems for execution of actions in accordance with the workflow.

If the workflow orchestration system determines that authorization has been obtained from the plurality of different sub-systems for execution of the workflow, the workflow orchestration system may identify 510 any conditions specified by any of the sub-systems in their respective digitally signed work order objects. For instance, a sub-system may define an expiration time for the authorization granted to the workflow orchestration system for execution of the set of actions assigned to the sub-system. Based on these conditions, the workflow orchestration system may generate 512 an ordering of the actions that are to be performed for execution of the workflow. This may cause the workflow orchestration system to prioritize work order objects having the earliest expiration time for their respective authorizations. Further, if a condition specifies that certain actions are to be performed prior to other actions, this may be used by the workflow orchestration system to prioritize performance of these actions, resulting in the work order object that specifies these actions being prioritized over the work order object that specifies the other actions. If there are no conditions specified by the sub-systems, the workflow orchestration system may transmit the work order objects in any order to the sub-systems.

It should be noted that the conditions specified in the work order objects may be defined by the workflow orchestration system in response to a set of requirements or conditions provided by a customer of the workflow orchestration system for execution of the workflow. For instance, a customer of the workflow orchestration system may define, within the work order object, a deadline for execution of the set of actions specified in the work order object. A sub-system that obtains this work order object may evaluate the set of actions specified and the deadline to determine whether the set of actions can be executed prior to this deadline. Based on this determination, the sub-system may determine whether to provide an authorization for execution of this set of actions. Further, it should be noted that the ordering of the actions that are to be performed for execution of the workflow may be defined based on requirements specified by a customer of the workflow orchestration system or entities other than the sub-systems. For instance, a customer may provide its own ordering to the workflow orchestration system, which the workflow orchestration system may use to define a set of conditions for execution of the set of actions specified in the work order objects.

Figure 6:
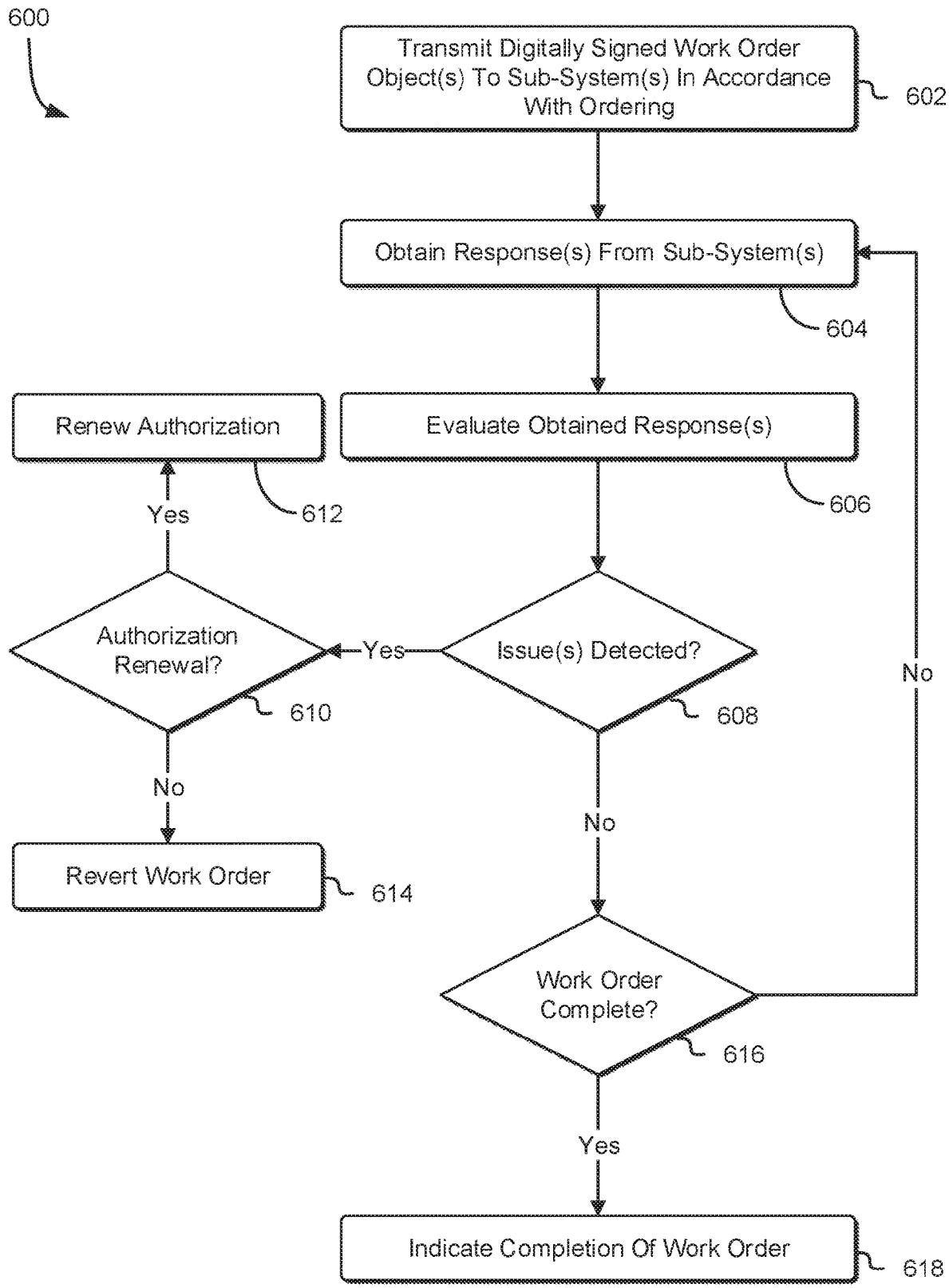
FIG. 6 shows an illustrative example of a process for executing a workflow specified in a work order in accordance with at least one embodiment.

As noted above, once the workflow orchestration system has obtained authorization from the individual sub-systems of the plurality of different sub-systems, the workflow orchestration system may transmit the digitally signed work order objects to the corresponding sub-systems for execution of the workflow. The workflow orchestration system may monitor the execution of the workflow to determine whether the execution of the workflow has been completed or an issue has been detected impacting the execution. If an issue is detected, the workflow orchestration system may attempt renewal of an authorization to execute any actions impacted by the issue from the corresponding sub-systems. If the issue cannot be addressed, the workflow orchestration system can revert the work order and generate a new work order, thereby defining a new workflow and actions that, if executed, would result in the objective defined through the workflow orchestration system being achieved. Accordingly, FIG. 6 shows an illustrative example of a process 600 for executing a workflow specified in a work order in accordance with at least one embodiment. The process 600 may be performed by the aforementioned workflow orchestration system.

The workflow orchestration system may transmit 602 the digitally signed work order objects obtained from the plurality of different sub-systems to the corresponding sub-systems that are to execute the workflow defined by the workflow orchestration system. As noted above, if any of the digitally signed work order objects specify one or more conditions that are to be satisfied in order for the actions specified therein to be executed, the workflow orchestration system may generate an ordering of the digitally signed work order objects. Thus, the workflow orchestration system may transmit these digitally signed work order objects in accordance with the ordering generated based on the conditions specified therein.

The workflow orchestration system may monitor execution of the workflow and obtain 604 responses from the sub-systems indicating performance of the actions specified in their corresponding work order object. In response to obtaining one or more responses from the sub-systems, the workflow orchestration system may evaluate 606 these responses to determine 608 whether there are any issues related to execution of the workflow. For instance, a sub-system may indicate, in its response to the workflow orchestration system, that a condition was not satisfied for execution of the actions specified in the work order object. Additionally, or alternatively, a sub-system may indicate in its response that that authorization granted to the workflow orchestration system for execution of these actions was not valid and, thus, the actions could not be executed. As another example, the workflow orchestration system may determine that a sub-system is inoperative or offline and was unable to execute the actions specified in the work order object sent to the sub-system.

If the workflow orchestration system detects an issue related to the execution of the workflow, the workflow orchestration system may determine 610 whether authorization for execution of the impacted actions can be obtained from the sub-systems that have indicated the issue. As noted above, each authorization granted to the workflow orchestration system may be a one-time authorization whereby a sub-system may revoke the authorization once a digitally signed work order object that includes the authorization is received. Thus, in an embodiment, the workflow orchestration system generates a new work order object that can be sent to a sub-system to renew 612 its authorization for execution of the actions specified in the work order object. For instance, the workflow orchestration system may define an alternative set of actions that may result in an authorization being granted subject to fewer or no conditions imposed by the sub-system.

However, if the workflow orchestration system determines that authorization for execution of any of the impacted actions cannot be obtained or that the workflow can no longer be executed successfully due to the issue, the workflow orchestration system may revert 614 the work order. For instance, the workflow orchestration system may transmit a request to any sub-system executing their respective actions to suspect execution of these actions. This may result in the suspension of the workflow. Further, the workflow orchestration system may discard the present work order in favor of a new work order that defines a new set of actions to be executed by the different sub-systems. This new set of actions may be different from those in the original work order. Additionally, or alternatively, the workflow orchestration system may identify new and/or alternative sub-systems for execution of the workflow. Thus, the workflow orchestration system may establish a new trust relationship with each of these new and/or alternative sub-systems in order to initiate the new workflow. In some instances, the workflow orchestration system may transmit a request to any sub-systems that have executed their corresponding set of actions to revert to an original state and undo any actions previously performed on behalf of the workflow orchestration system.

If the workflow orchestration system does not detect, based on the responses obtained from the sub-systems, any issued related with execution of the workflow, the workflow orchestration system may determine 616 whether the work order has been completed successfully. For instance, if the workflow orchestration system has not obtained a response from one or more sub-systems, but no issues has been detected related to execution of the workflow, the workflow orchestration system may continue to obtain 604 responses from these other sub-systems and continue its evaluation of these responses to identify any issues that may have been detected related to execution of the workflow. However, if the workflow orchestration system has obtained responses from the individual sub-systems of the plurality of sub-systems that indicate completion of the execution of the workflow, the workflow orchestration system may indicate 618 that the work order and, hence, execution of the workflow, was completed successfully. This may include notifying one or more entities (e.g., administrators, customers, etc.) that the objective associated with the workflow has been achieved and that the sub-systems are now in coordination for the purpose defined by these entities through the objective.

Figure 7:
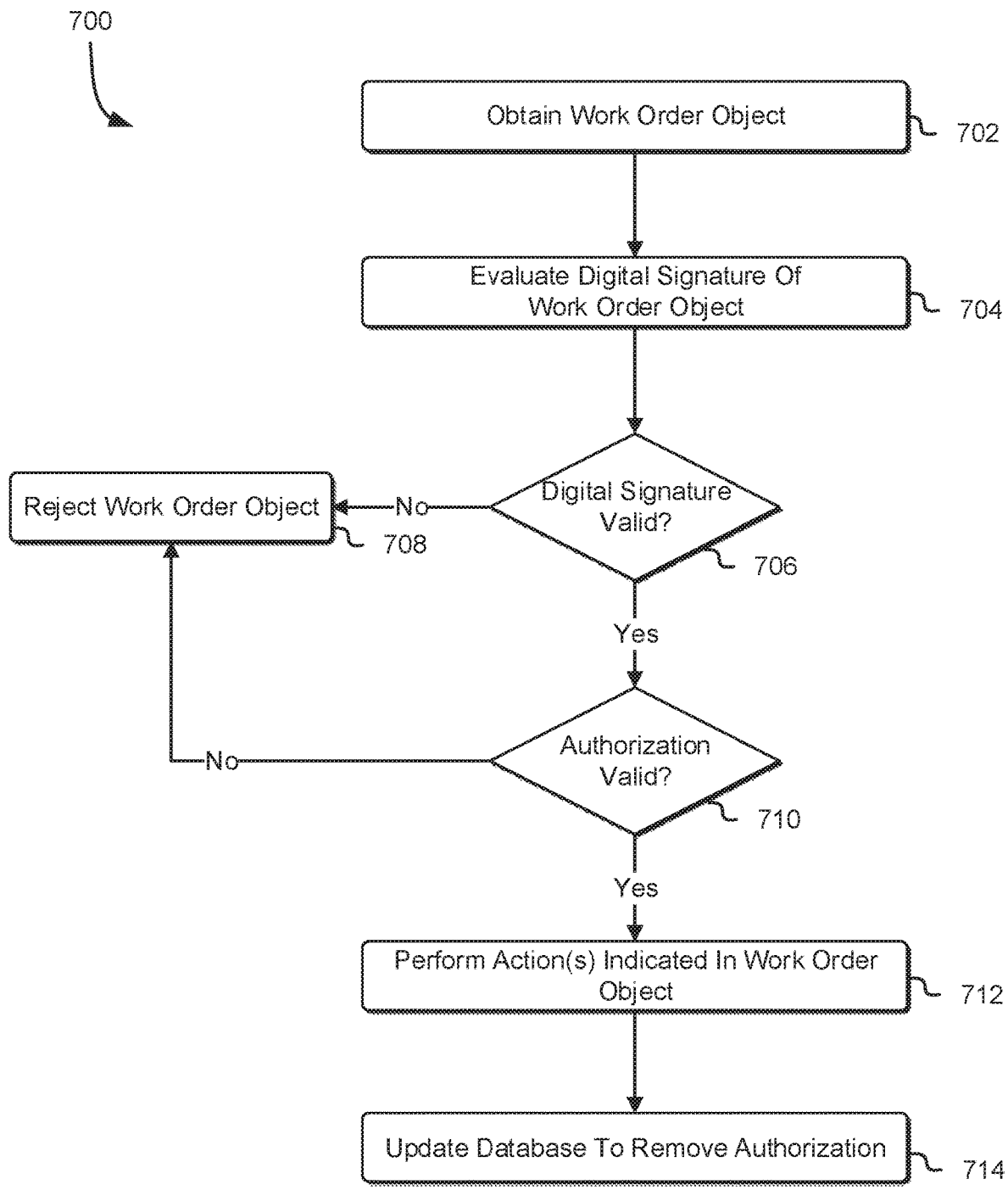
FIG. 7 shows an illustrative example of a process for executing a set of actions specified in a work order object from the workflow orchestration system in accordance with at least one embodiment.

As noted above, a sub-system may provide an authorization for execution of a set of actions specified in a work order object from a workflow orchestration system. This authorization may be provided through a digital signature or other cryptographically verifiable assertion inserted into the work order object. Further, the sub-system may impose one or more conditions for execution of the actions specified in the work order object. The authorization provided by the sub-system may be utilized a single time, whereby the sub-system may revoke the authorization once it has been utilized through receipt of a work order object that includes a digital signature or other cryptographically verifiable assertion of the authorization. Accordingly, FIG. 7 shows an illustrative example of a process 700 for executing a set of actions specified in a work order object from the workflow orchestration system in accordance with at least one embodiment. The process 700 may be performed by any sub-system that has established a trust relationship with the workflow orchestration system and has provided an authorization, via a digitally signed work order object, to the workflow orchestration system for execution of a set of actions specified in the work order object.

A sub-system may obtain 702 a work order object from a workflow orchestration system for execution of a set of actions specified in the work order object. This work order object may include a digital signature of the sub-system or any other cryptographically verifiable assertion of an authorization by the sub-system for execution of these actions. For instance, as described above, a workflow orchestration system may transmit an unsigned work order object to the sub-system to obtain an authorization for execution of the actions proposed by the workflow orchestration system. The sub-system may evaluate the unsigned work order object and determine whether to authorize execution of these actions. If the sub-system determines that authorization may be granted for execution of these actions, the sub-system may generate a digital signature or other cryptographically verifiable assertion of an authorization that may be added to the work order object. In some instances, the sub-system may also impose one or more conditions that are to be satisfied in order for the actions to be executed by the sub-system.

In response to obtaining a work order object from the workflow orchestration service, the sub-system may evaluate 704 the digital signature or other cryptographically verifiable assertion of an authorization from the work order object to determine 706 whether it is valid. As noted above, the sub-system may store a copy of the work order object and the digital signature generated by the sub-system to provide authorization for performance of the actions specified in the work order object in its authorization database. The authorization database may comprise a key-value datastore whereby authorization information may be stored for work order objects obtained from the workflow orchestration system. Each entry in the authorization database corresponding to a work order object may specify the authorization mechanisms utilized for generating the digital signature or other cryptographically verifiable assertion of an authorization for execution of the actions specified in the work order object. Further, the entry may specify the cryptographic algorithm or other method utilized to generate the digital signature. This may allow the sub-system to verify the digital signature in response to obtaining a digitally signed work order object specifying a digital signature of the sub-system.

If the sub-system is unable to validate the digital signature or other cryptographically verifiable assertion of an authorization from the work order object, the sub-system may reject 708 the work order object. For instance, if the sub-system determines that the digital signature presented in the work order object does not correspond to any digital signature stored in the authorization database of the sub-system, the sub-system may determine that authorization does not exist for execution of the set of actions specified in the work order object. Similarly, if the sub-system is unable to validate the digital signature using the cryptographic key or other cryptographic method assigned for the particular work order object, the sub-system may determine that the digital signature provided in the work order object is not valid. The sub-system may transmit a notification to the workflow orchestration system to indicate that the work order object has been rejected.

If the sub-system determines that the digital signature or other cryptographically verifiable assertion of an authorization is valid, the sub-system may determine 710 whether the authorization associated with the digital signature or other cryptographically verifiable assertion of the authorization is still valid. For instance, if the sub-system imposed one or more conditions for execution of the set of actions specified in the work order object, the sub-system may determine whether these conditions have been met in order for the authorization to be valid. As an illustrative example, if the sub-system has imposed an expiration time for execution of the actions specified in the work order object, if the sub-system obtains the work order object after the expiration time has passed, the sub-system may determine that the authorization is no longer valid even though the digital signature attached to the work order object remains valid. If the authorization is no longer valid, the sub-system may reject 708 the work order object.

The sub-system may perform 712 the actions specified in the work order object in response to a determination that the digital signature or other cryptographically verifiable assertion of an authorization and the authorization itself are valid. Further, the sub-system may update 714 its authorization database to remove the authorization previously granted for execution of these actions. For instance, the sub-system may remove the digital signature or other cryptographically verifiable assertion of the authorization from its authorization database. Thus, if the sub-system obtains another work order object specifying the same digital signature or assertion, the sub-system may be unable to validate the digital signature or assertion as it is no longer present in its authorization database. This ensures that the authorization granted for execution of these actions can be used for a single instance.

In an embodiment, the authorization granted by the sub-system can be utilized multiple times. For instance, the sub-system may grant the workflow orchestration system an authorization for execution of the set of actions specified in the work order object a set number of times before the authorization is revoked. Thus, in response to obtaining the digitally signed work order object from the workflow orchestration system, the sub-system may determine how many remaining uses for the granted authorization are available once the set of actions are performed. If there are no remaining uses for the granted authorization, the sub-system may revoke the authorization. However, if there are remaining uses for the granted authorization, the sub-system may update its authorization database to indicate the number of remaining uses for the granted authorization. This may allow the workflow orchestration system to submit the same digitally signed work order object to the sub-system for execution of the set of actions specified therein numerous times subject to the number of times the authorization granted by the sub-system may be utilized.

As another example, the sub-system may grant the workflow orchestration system an authorization for execution of the set of actions specified in the work order object any number of times within a time period defined by the sub-system. This may allow the workflow orchestration system to submit as many requests as possible within this time period for execution of a set of actions defined in a work order object that specifies this particular authorization. The sub-system may revoke this authorization if it detects that the time period has elapsed for execution of these actions specified in the digitally signed work order object.

Figure 8:
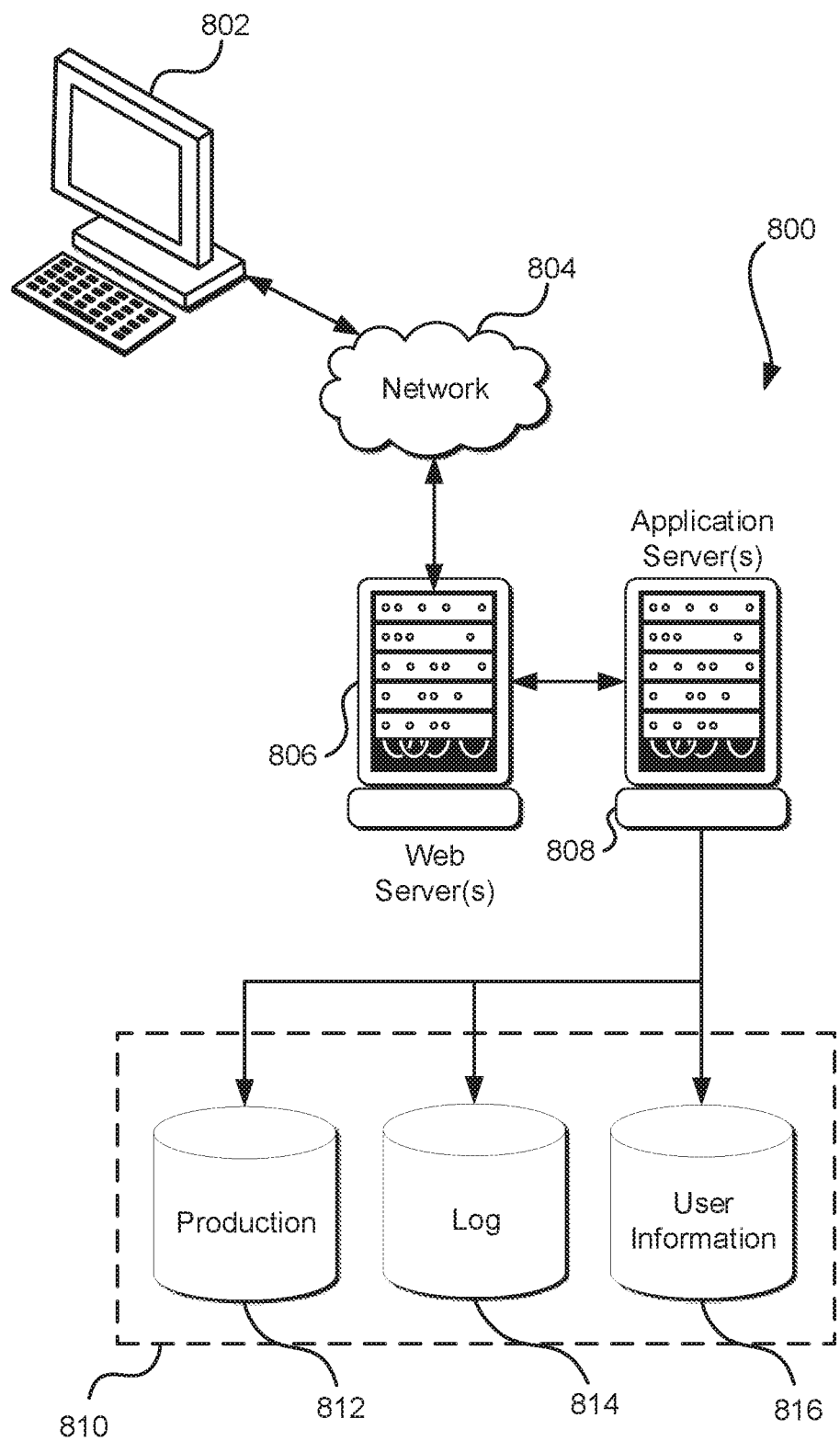
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java °, C, C# or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
collecting a plurality of cryptographically signed documents for execution of a workflow to update a plurality of different sub-systems, the plurality of cryptographically signed documents comprising:
a first document indicating a first action to be executed by a first sub-system of the plurality of sub-systems and comprising a first digital signature indicating authorization for the first action to be executed, the first digital signature being verifiable by the first sub-system; and
a second document indicating a second action to be executed by a second sub-system of the plurality of sub-systems and comprising a second digital signature indicating authorization for the second action to be executed, the second digital signature being verifiable by the second sub-system;
determining that the plurality of cryptographically signed documents indicates a sufficient set of authorizations for the workflow to be successfully completed; and
executing the workflow by at least transmitting a first instruction with the first document to the first sub-system and transmitting a second instruction with the second document to the second sub-system according to the workflow.

2. The computer-implemented method of claim 1, further comprising:
obtaining, from the first sub-system, an indication that an issue was detected related to execution of the first instruction;
transmitting a request to the first sub-system to obtain a new document indicating the first action and comprising a new digital signature indicating a new authorization for the action to be executed, the new digital signature being verifiable by the first sub-system; and
in response to obtaining the new document, transmitting a new instruction with the new document to the first sub-system for execution of the first action.

3. The computer-implemented method of claim 1, further comprising determining, from the plurality of cryptographically signed documents, an ordering for executing the workflow such that the first instruction and the second instruction are transmitted in accordance with the ordering.

4. The computer-implemented method of claim 1, wherein the first digital signature and the second digital signature are revoked in response to successful execution of the workflow.

5. A system, comprising:
one or more processors; and
memory to store instructions that, as a result of being executed by the one or more processors, cause the system to:
obtain a plurality of documents for execution of a workflow on a plurality of different sub-systems, the plurality of documents comprising:
a first document indicating a first action to be executed by a first sub-system of the plurality of sub-systems and comprising a first authorization for the first action to be executed, the first authorization being verifiable by the first sub-system; and
a second document indicating a second action to be executed by a second sub-system of the plurality of sub-systems and comprising a second authorization for the second action to be executed, the second authorization verifiable by the second sub-system;
determine that the plurality of documents provides a sufficient set of authorizations for the workflow to be completed successfully; and
execute the workflow.

6. The system of claim 5, wherein the instructions further cause the system to:
obtain, from a sub-system of the plurality of sub-systems, an indication that an issue was detected related to execution of the workflow;
transmit a request to the sub-system to obtain a new document indicating an action to be executed by the sub-system and comprising a new authorization for the action to be executed, the new authorization being verifiable by the sub-system;
obtain the new document; and
transmit a new instruction with the new document to the sub-system for execution of the action.

7. The system of claim 5, wherein:
the first authorization is indicated using a first digital signature of the first sub-system; and
the second authorization is indicated using a second digital signature of the second sub-system.

8. The system of claim 5, wherein the instructions further cause the system to:
obtain, from a sub-system of the plurality of sub-systems, an indication that an issue was detected related to execution of the workflow;
determine that the execution of the workflow cannot be completed successfully, resulting in a determination; and
revert the workflow in response to the determination.

9. The system of claim 5, wherein
the first authorization is revoked in response to a determination by the first sub-system that a limit on usage of the first authorization has been reached.

10. The system of claim 5, wherein the one or more services further determine an ordering for the execution of the first action and the execution of the second action based on a set of conditions obtained in a request to execute the workflow.

11. The system of claim 5, wherein:
the first authorization is indicated using a first cryptographic protocol; and
the second authorization is indicated using a second cryptographic protocol, the second cryptographic protocol being different from the first cryptographic protocol.

12. The system of claim 5, wherein the instructions further cause the system to establish a secure communications session with the plurality of different sub-systems to allow receipt of the plurality of documents and to execute the workflow.

13. A non-transitory computer-readable storage medium having stored thereon executable instructions that, as a result of being executed by one or more processors of a computer system, cause the computer system to at least:
- obtain a set of documents for execution of a workflow to update a plurality of different sub-systems, the set of documents comprising individual cryptographically verifiable assertions of authorizations to cause actions to be performed by respective sub-systems of the plurality of different sub-systems; and
- as a result of the set of documents providing a sufficient set of authorizations to perform the workflow, execute the workflow using the set of documents to cause the plurality of sub-systems to perform the actions.

14. The non-transitory computer-readable storage medium of claim 13, wherein the individual cryptographically verifiable assertions of the authorizations are digital signatures of the respective sub-systems.

15. The non-transitory computer-readable storage medium of claim 13, wherein the individual cryptographically verifiable assertions of the authorizations are indicated using different cryptographic protocols of the respective sub-systems.

16. The non-transitory computer-readable storage medium of claim 13, wherein:
- the set of documents further comprising individual conditions for performance of the actions by the respective sub-systems of the plurality of different sub-systems; and
- the instructions further cause the computer system to determine an ordering for execution of the workflow based on the individual conditions.

17. The non-transitory computer-readable storage medium of claim 13, wherein the instructions further cause the computer system to:
- obtain, from a sub-system of the plurality of sub-systems, an indication that execution of the workflow cannot be completed successfully; and
- revert the workflow in response to the indication.

18. The non-transitory computer-readable storage medium of claim 13, wherein the instructions further cause the computer system:
- obtain, from a sub-system of the plurality of sub-systems, an indication that an issue was detected related to execution of the workflow;
- transmit a request to the sub-system to obtain a new document specifying a new cryptographically verifiable assertion of an authorization to cause the sub-system to perform a set of actions;
- obtain the new document; and
- use the new document to cause the sub-system to perform the set of actions.

19. The non-transitory computer-readable storage medium of claim 13, wherein:
- an individual cryptographically verifiable assertion of an authorization specified in a document of the set of documents is valid within a time period defined by a sub-system of the plurality of different sub-systems; and
- the individual cryptographically verifiable assertion is revoked in response to a determination that the time period has elapsed.

20. The non-transitory computer-readable storage medium of claim 13, wherein the instructions further cause the computer system to:
- identify, based on the workflow, the plurality of different sub-systems for execution of the actions; and
- establish a secure communications session with the plurality of different sub-systems to obtain the set of documents.

* * * * *